United States Patent
Hammarwall et al.

(10) Patent No.: US 9,838,889 B2
(45) Date of Patent: *Dec. 5, 2017

(54) LINK QUALITY ESTIMATION AND APPARATUS IN A TELECOMMUNICATION SYSTEM

(71) Applicant: Telefonaktiebolaget L M Ericsson (publ), Stockholm (SE)

(72) Inventors: David Hammarwall, Vallentuna (SE); George Jöngren, Sundbyberg (SE); Magnus Lundevall, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 4 days.

This patent is subject to a terminal disclaimer.

(21) Appl. No.: 15/077,076

(22) Filed: Mar. 22, 2016

(65) Prior Publication Data

US 2016/0205566 A1 Jul. 14, 2016

Related U.S. Application Data

(63) Continuation of application No. 13/660,158, filed on Oct. 25, 2012, now Pat. No. 9,300,432, which is a (Continued)

(51) Int. Cl.
*H04W 24/02* (2009.01)
*H04L 1/00* (2006.01)
(Continued)

(52) U.S. Cl.
CPC .......... *H04W 24/02* (2013.01); *H04L 1/0034* (2013.01); *H04L 5/0023* (2013.01);
(Continued)

(58) Field of Classification Search
CPC .... H04L 1/0034; H04L 1/0026; H04L 1/1607
See application file for complete search history.

(56) References Cited

U.S. PATENT DOCUMENTS 6,802,035 B2  10/2004  Catreux et al.
7,197,281 B2   3/2007  Pietraski et al.
(Continued)

FOREIGN PATENT DOCUMENTS

CN   101084639 A   12/2007
EP    1463230 A2    9/2004
(Continued)

OTHER PUBLICATIONS

Ericsson, "CQI Measurement Methodology", pp. 1-7, 3GPP TSG RAN WG1 #52, Feb. 11, 2008, Agenda Item 6.3.5, R1-080887, 3rd Generation Partnership Project, Sorrento, Italy.
(Continued)

*Primary Examiner* — Siming Liu
(74) *Attorney, Agent, or Firm* — Coats & Bennett, PLLC

(57) ABSTRACT

Method and apparatus for enabling accurate link quality estimation of a wireless link between a sending node and a receiving node. When the sending node receives link state reports from the receiving node, it estimates the current state of the wireless link. The sending node also determines a measurement adjusting parameter if the link state reports are deemed inaccurate in relation to the estimated link state, based on a deviation between the received link state reports and the estimated actual link state. The sending node then sends the determined measurement adjusting parameter to the receiving node, and the receiving node provides a link state report based on signal measurements adjusted by the measurement adjusting parameter. The adjusted link state report can then be used for link adaptation of the wireless link and/or for packet scheduling decisions.

20 Claims, 2 Drawing Sheets

Related U.S. Application Data continuation of application No. 12/866,585, filed as application No. PCT/EP2008/058217 on Jun. 26, 2008, now Pat. No. 8,325,624.

(60) Provisional application No. 61/027,535, filed on Feb. 11, 2008.

(51) Int. Cl.
*H04L 5/00* (2006.01)
*H04W 72/04* (2009.01)
*H04W 72/08* (2009.01)
*H04W 88/08* (2009.01)
*H04L 1/16* (2006.01)

(52) U.S. Cl.
CPC ..... *H04W 72/0406* (2013.01); *H04W 72/082* (2013.01); *H04W 72/085* (2013.01); *H04L 1/0026* (2013.01); *H04L 1/1607* (2013.01); *H04W 88/08* (2013.01)

(56) References Cited

U.S. PATENT DOCUMENTS

| | | | |
|---|---|---|---|
| 7,301,928 | B2 | 11/2007 | Nakabayashi et al. |
| 7,688,798 | B2 | 3/2010 | Dottling et al. |
| 7,783,295 | B2 | 8/2010 | Ishii et al. |
| 7,894,822 | B2 | 2/2011 | Jonsson |
| 7,907,973 | B2 | 3/2011 | Hoshino et al. |
| 8,325,624 | B2 * | 12/2012 | Hammarwall ........ H04L 1/0034 370/252 |
| 9,300,432 | B2 * | 3/2016 | Hammarwall ........ H04L 1/0034 |
| 2006/0057965 | A1 | 3/2006 | Braun et al. |

FOREIGN PATENT DOCUMENTS

| | | |
|---|---|---|
| EP | 1589715 A1 | 10/2005 |
| JP | 2004186969 A | 2/2004 |
| JP | 2004165834 A | 6/2004 |
| JP | 2005521358 A | 7/2005 |
| JP | 2005354270 A | 12/2005 |
| JP | 2006081172 A | 3/2006 |
| JP | 2006517752 A | 7/2006 |
| JP | 2007159054 A | 6/2007 |
| JP | 2007521750 A | 8/2007 |
| WO | 0225853 A2 | 3/2002 |
| WO | 2006052448 A2 | 5/2006 |
| WO | 2006065181 A1 | 6/2006 |
| WO | 2007024851 A2 | 3/2007 |

OTHER PUBLICATIONS

Texas Instruments, Codeword-to-Layer Mapping for E-UTRA MIMO, pp. 1-6, 3GPP TSG RAN WG1 48, Feb. 12-16, 2007, R1-071199, St. Louis, USA.

* cited by examiner

LINK QUALITY ESTIMATION AND APPARATUS IN A TELECOMMUNICATION SYSTEM

This application is a continuation of U.S. application Ser. No. 13/660,158, filed 25 Oct. 2012, which is a continuation of U.S. application Ser. No. 12/866,585, filed 6 Aug. 2010, which was the National Stage of International Application No. PCT/EP2008/058217, filed 26 Jun. 2008, which claims benefit of U.S. Provisional Application No. 61/027,535 filed 11 Feb. 2008, the disclosures of each of which are incorporated herein by reference in their entirety.

TECHNICAL FIELD

The present invention relates generally to a method and apparatus for optimizing wireless transmissions in a telecommunication system by means of more accurate link quality estimation.

BACKGROUND

In 3GPP ($3^{rd}$ Generation Partnership Project), the packet-switched communication systems HSPA (High Speed Packet Access) and LTE (Long Term Evolution) have been specified for wireless transmission of data packets between user terminals and base stations in a cellular/mobile network. In this description, the term "base station" is used to generally represent any network node capable of wireless communication with a user terminal.

LTE systems generally use OFDM (Orthogonal Frequency Division Multiplexing) involving multiple narrowband sub-carriers which are further divided into time slots to form a so-called "time-frequency grid" where each frequency/timeslot combination is referred to as a "Resource Element RE". In LTE, multiple antennas can also be employed in both user terminals and base stations for obtaining parallel and spatially multiplexed data streams, e.g. according to MIMO (Multiple Input Multiple Output), which is well-known in the art. Other wireless communication systems relevant for the following description include WCDMA (Wideband Code Division Multiple Access), WiMAX, UMB (Ultra Mobile Broadband), GPRS (General Packet Radio Service) and GSM (Global System for Mobile communications).

A base station of a cell in a wireless network may transmit data and control information in a physical downlink channel to a user terminal or "UE" (User Equipment), and a user terminal may likewise transmit data and control information in a physical uplink channel in the opposite direction to the base station. In this description, a physical downlink or uplink channel is generally referred to as a wireless link between a sending node and a receiving node. Further, the terms "sending node" and "receiving node" are used here merely to imply the direction of the wireless link considered, although these nodes can of course both receive and send data and messages in an ongoing communication. Further, the term "Resource Element RE" is used in this description to generally represent a signal bearer element that can carry a signal over a wireless link, without limitation to any transmission technology such as LTE. For example, an RE can incorporate a specific code and timeslot in a system using CDMA (Code Division Multiple Access), or a specific frequency and timeslot in a system using TDMA (Time Division Multiple Access), and so forth.

When two nodes in a cell communicate over a wireless link that is configured according to various link parameters, one or more such link parameters can be adapted to the current state of the link on a dynamic basis, often referred to as link adaptation. Such link parameters may include transmission power, modulation schemes, encoding schemes, multiplexing schemes, and the number of parallel data streams when multiple antennas are used, the latter link parameter being called "transmission rank". Link adaptation is used to generally optimize transmission in order to increase capacity and data throughput in the network. Further, link adaptation can be employed for the uplink and the downlink independently, if applicable, since the current state of the uplink and downlink can be very different, e.g. due to different interference and when frequency and/or time are widely separated for uplink and downlink transmissions between the two nodes.

To support link adaptation during an ongoing communication between a sending node and a receiving node, either on the uplink or downlink, the receiving node is often required to measure certain link parameters and report recommended link parameters to the sending node, such as a recommended transmission rank and/or a recommended precoder matrix. Also, the quality of the received signal is often measured, typically in terms of a Signal to Interference and Noise Ratio SINR, e.g. separately for different parallel data streams, assuming that the recommended link parameters are used by the sending node. Based on the recommended link parameters and measured SINR value(s), the receiving node estimates so-called "Channel Quality Indicators" CQIs, e.g. one CQI for each coded data block (codeword), that are used together with the link parameters to indicate the current state of the link, which is reported back to the sending node. In this description, a reported CQI or the equivalent and/or recommended link parameters will be called a "link state report" for short. The sending node can then adapt one or more link parameters depending on the received link state report. When the sending node is a base station using packet switching for downlink transmissions, the reported CQIs may also be used for packet scheduling decisions.

Typically, specific known reference symbols RS are regularly transmitted over a wireless link according to a predetermined scheme to support the above link quality estimation, such that the receiving node is able to detect noise and interference more easily without having to decode the received signal. In an OFDM-based LTE system, these RSs are transmitted from base stations in predetermined REs in the time-frequency grid as known by the receiving terminal.

In general, a received signal "r" in an RE is basically comprised of transmitted symbols "s" as well as noise and interference "n". Thus:

$$r = Hs + n \qquad (1)$$

Generally, r, s and n are vectors and H is a matrix, where "H" represents the channel response which can be derived from a channel estimator in the receiver. However, the noise and interference of a signal in an RE display different characteristics depending on whether the RE contains payload data, control signalling or an RS, as the interference mix hitting the different types of REs may typically have different transmission power and spatial characteristics, e.g. due to time and/or frequency synchronization in neighboring cells. The interference/noise "I" in these different signal types may be characterized in terms of second order statistics that can be obtained by frequently measuring the signals over time, although "I" can be characterized in other ways as well.

If an RE contains an RS signal received by a user terminal, the terminal is able to estimate the interference/noise n=I(RS) of the RS signal since s are known symbols in this case and H is given by the channel estimator. If the RE contains data scheduled for the terminal, the interference/noise n=I(data) can also be estimated once the data symbols have been detected (i.e. decoded) by the terminal, s thereby being known at that point. Similarly, the interference/noise of an RE with control signalling, n=I(control), can be estimated if the control symbols can be detected.

In order to obtain proper link quality estimation and to determine an accurate CQI and/or link parameter recommendation for a link, the receiving node needs sufficient statistics from measuring signals transmitted on the link. Furthermore, the characteristics of inter-cell interference may be significantly different depending on what signal type is causing the interference from neighboring cells, i.e. RS signals, data signals or control signals. If payload data is transmitted over the link to be estimated, the receiving node should preferably measure the interference I(data) that hits the data signals. However, the measurements would then be limited to REs that contain data scheduled for the user terminal involved, which may be too scarce such that the statistic basis for determining the CQI is insufficient. Moreover, the data symbols must be detected and decoded, and possibly also re-encoded, before the interference I(data) can be properly estimated, which may impose substantial costs and/or unacceptable delays due to the data processing.

Alternatively or additionally, the receiving node can measure the interference I(RS) for REs containing an RS which may occur more frequently than the REs containing scheduled data. Measuring I(RS) is also generally more reliable since the RS is always known to the receiving node. However, the interference that hits RS signals may be significantly different from that hitting the data signals, e.g. with respect to statistics. Therefore, a CQI and/or link parameter recommendation determined from I(RS) measurements may not be representative for a link with payload data transmission. As a result, the link adaptation at the sending node may not be optimal for data due to either too optimistic or too pessimistic CQI and/or link parameter recommendation from the receiving node. Hence, if the measured I(RS) is significantly greater than the actual I(data), the CQI and/or link parameter recommendation will be based on an overestimated interference (or underestimated SINR) and therefore unduly pessimistic, and vice versa.

For example, when MIMO is employed in an LTE system, the RE holding an RS from one antenna at the sending node must be empty for a neighboring antenna, which substantially limits the number of REs available for RS transmissions. As a result, the interference that hits REs containing an RS will largely come from RS transmissions in other cells due to reuse of the RS transmission pattern. As mentioned above, RSs are always transmitted from base stations according to a predetermined scheme and at a relatively high fixed power in order to be received by any terminal in the cell, whereas payload data is only transmitted when scheduled for a specific terminal. Thus, in a situation with low data traffic and/or low transmission power for data signals, I(data) is generally lower than I(RS).

Furthermore, control signals are often transmitted with greater power than data signals, due to different power regulation. Therefore, the interference measured for an RE affected by control signal interference may be different from that of an RE affected by data signal interference.

Hence, it is often difficult to obtain accurate estimates of the inter-cell interference that hits data transmissions, in particular if the interference measurements are performed on RS transmissions, as explained above. Inaccurate estimates of the SINR may thus result in misleading CQIs and non-optimal link parameter recommendations such as transmission rank. A consequence for MIMO systems is that an underestimated SINR may result in a too pessimistic transmission rank when the used link can actually support a transmission rank greater than the recommended one. Both of these issues may well result in reduced throughput. On the other hand, if the SINR is overestimated, the link may not be able to support any recommended CQIs (including a recommended Modulation and Coding Scheme MCS) and transmission rank, resulting in excessive decoding errors and thereby reduced throughput also in this case.

However, the base station may monitor so-called "ACK/NACK signalling" from the terminal for received data blocks, and detect if a Block Error Rate BLER or the like is below or above a predetermined target value. From this information, the base station can decide to use a more offensive or defensive MCS than recommended by the terminal. However, if the base station selects a transmission rank different from the recommended one, the reported CQI will be largely irrelevant since, in most cases, it relates directly to the transmission rank. Consequently, the base station would not have a proper basis for selecting the MCS and other link parameters for the different data streams.

It is thus generally a problem that, in a communication with dynamic link adaptation, a signal sending node may receive inaccurate link quality estimations and/or link parameter recommendations from a signal receiving node, such that the used link parameters are not optimal or appropriate for the actual link used in the communication.

SUMMARY

It is an object of the present invention to generally address the problems outlined above. Further, it is an object to provide a solution for obtaining more accurate link or channel quality estimation and/or transmission rank recommendations, e.g. to support dynamic link adaptation of a wireless link. These objects and others may be accomplished by a method and apparatus according to the attached independent claims.

According to one aspect, a method is provided in a sending node for enabling accurate link quality estimation of a wireless link used for transmitting signals from the sending node to a receiving node. In the method, at least one link state report is received from the receiving node, and the current state of the wireless link is also estimated. A measurement adjusting parameter is determined if the at least one received link state report is deemed inaccurate in relation to the estimated link state, based on a deviation between the received link state report(s) and the estimated actual link state. The determined measurement adjusting parameter is then sent to the receiving node, and a link state report is received from the receiving node which is based on signal measurements adjusted by the measurement adjusting parameter. Thereby, inaccurate link quality estimations and/or link parameter recommendations can be avoided, and the sending node is able to use optimal or appropriate link parameters when communicating with the receiving node.

According to another aspect, an apparatus is provided in a sending node for enabling accurate link quality estimation of a wireless link used for transmitting signals from the sending node to a receiving node. The sending node apparatus comprises a sending unit adapted to send signals to the receiving node over the wireless link, a report receiver adapted to receive link state reports from the receiving node, and a link state estimator adapted to estimate the current state of the wireless link. The sending node apparatus further comprises a determining unit adapted to determine a measurement adjusting parameter if at least one received link state report is deemed inaccurate in relation to the estimated link state, based on a deviation between the received link state report(s) and the estimated link state, and to send the determined measurement adjusting parameter to the receiving node. The report receiver is further adapted to receive a link state report from the receiving node which is based on signal measurements adjusted by the measurement adjusting parameter.

Different embodiments are possible in the sending node method and apparatus above. In one exemplary embodiment, the sending unit uses the adjusted link state report for link adaptation of the wireless link and/or for packet scheduling decisions. In another exemplary embodiment, the sending unit sends payload data and reference symbols to the receiving node which configures the link state reports based on signal measurements on the reference symbols, where the measurement adjusting parameter compensates for a difference in received power or SINR between measured signals and data signals.

The measurement adjusting parameter may be a Power Measurement Offset PMO that the receiving node uses for adjusting signal power or SINR measurements upon which the adjusted link state report is based.

Further, the link state reports may comprise a link quality estimation and/or link parameter recommendation, where the link quality estimation may comprise a Channel Quality Indicator CQI. The link parameter recommendation may comprise a preferred transmission rank specifying the number of parallel data streams when multiple antennas are used.

According to further exemplary embodiments, the link state estimator may estimate the current state of the wireless link by monitoring the amount of data errors occurring over the wireless link as compared to a predetermined target value. The link state estimator may then monitor ACK/NACK messages from the receiving node to determine whether a Block Error Rate BLER or equivalent parameter deviates from the target value. The link state estimator may also estimate the current state of the wireless link by monitoring the current traffic load in the network used.

According to yet another aspect, a method is provided in a receiving node for enabling accurate link quality estimation of a wireless link used for transmitting signals from a sending node to the receiving node. In this method, at least one link state report is sent to the sending node containing a link quality estimation and/or link parameter recommendation. When a measurement adjusting parameter is received from the sending node, a link quality estimation and/or link parameter recommendation is/are determined based on signal measurements adjusted by the received measurement adjusting parameter. An adjusted state report is then sent to the sending node containing the determined link quality estimation and/or link parameter recommendation.

According to yet another aspect, an apparatus is provided in a receiving node for enabling accurate link quality estimation of a wireless link used for transmitting signals from a sending node to the receiving node. This apparatus comprises a signal receiving unit adapted to receive signals from the sending node over the wireless link, a signal measuring unit adapted to measure received signals, a quality estimating unit adapted to estimate link quality and/or determine recommended link parameters, and a reporting unit adapted to send link state reports to the sending node. The quality estimating unit is further adapted to obtain a measurement adjusting parameter from the sending node, and to determine a link quality estimation and/or link parameter recommendation based on signal measurements adjusted by the received measurement adjusting parameter. The reporting unit is further adapted to send an adjusted link state report to the sending node containing the determined link quality estimation and/or link parameter recommendation.

Different embodiments are possible in the receiving node method and apparatus above. In one exemplary embodiment, the signal receiving unit receives payload data and reference symbols from the sending node, and the reporting unit configures the link state reports based on signal measurements on the reference symbols, where the measurement adjusting parameter compensates for a difference in received power or SINR of measured signals and data signals.

The measurement adjusting parameter may be a Power Measurement Offset PMO that is used for adjusting signal power or SINR measurements upon which the adjusted link state report is based.

Further possible features and benefits of the present invention will be explained in the detailed description below.

BRIEF DESCRIPTION OF THE DRAWINGS

The invention will now be explained in more detail by means of exemplary embodiments and with reference to the accompanying drawings, in which.

DETAILED DESCRIPTION

The present invention can be used to avoid inaccurate link quality estimations and/or link parameter recommendations, such that a sending node is able to use optimal or appropriate link parameters when transmitting payload data in communication with a receiving node. In particular, more accurate transmission rank recommendations can be obtained such that a sending node can utilize recommended CQIs to a large extent, because it does not have to override the recommended transmission rank. In the following description, it is assumed that link adaptation based on link state reports is employed, although the present invention is generally not limited thereto. In addition or alternatively, accurate link quality estimation can further be useful for scheduling decisions in packet-switched communications.

Briefly described, the sending node determines whether the reporting from the receiving node with link quality estimation and/or link parameter recommendation is accurate or inaccurate for the actual link used, by estimating the current state of the link. The link state can be estimated in different ways, e.g. by monitoring ACK/NACK messages from the receiving node to see how much data errors occur in the transmission, and/or by monitoring the current traffic situation in the network, which will be described in more detail below.

If the estimated link state indicates that the link state report is inaccurate, the sending node determines a "Power Measurement Offset PMO" or other measurement adjusting parameter that the receiving node will use for adjusting the signal power or SINR measurements or other signal measurements upon which the link quality estimation and/or link parameter recommendation is based. The receiving node then sends a PMO-adjusted link state report to the sending node which is able to use the PMO-adjusted link state report for more appropriate link adaptation. Thereby, link parameters will be selected that are more closely adapted to the current link state and with consideration to what the link can actually support.

The sending node may strive to configure a PMO profile such that the resulting link state reports from the receiving node becomes relevant or accurate for the estimated link state, e.g. by employing an iterative process of testing different PMO profiles. The sending node may also strive to configure the PMO profile such that the amount of data errors in the transmission does not significantly deviate from a target value. In general terms, the PMO is thus effectively a "measurement adjusting parameter", and these two expressions can be used in this description interchangeably.

Figure 1:
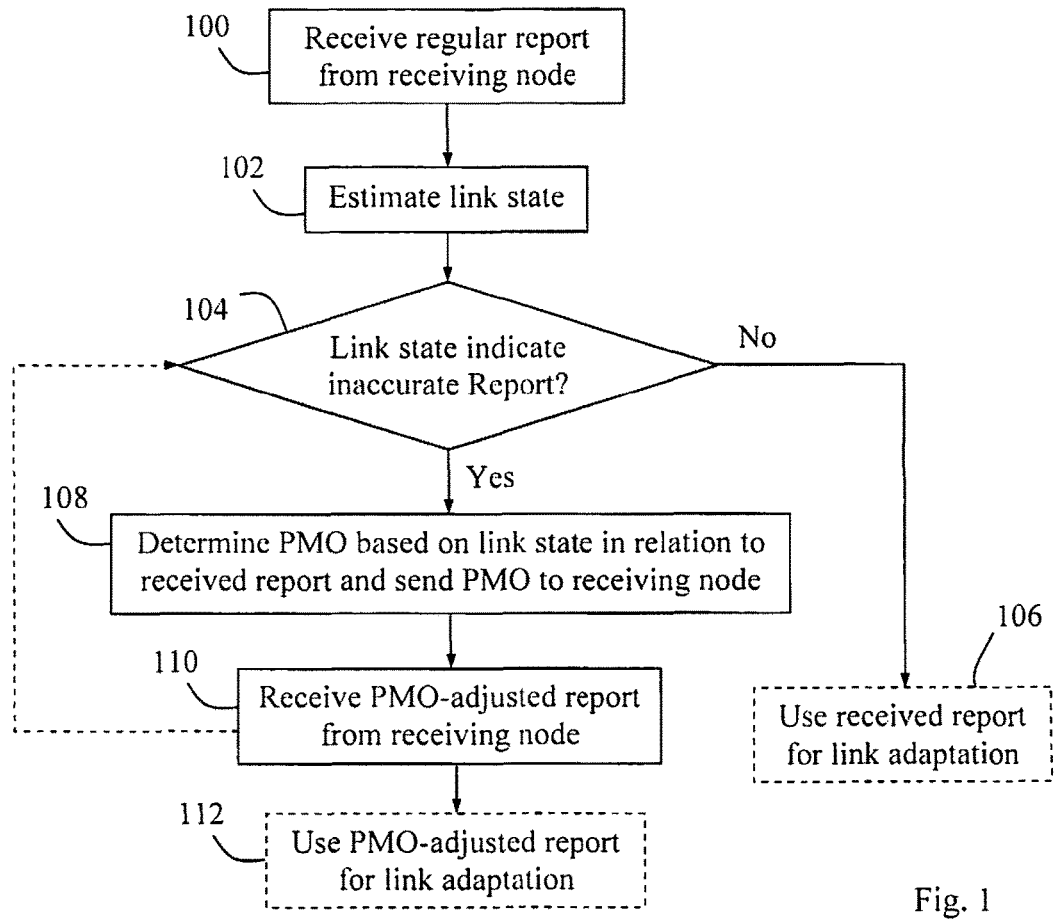
FIG. 1 is a flow chart illustrating a procedure for enabling accurate link quality estimation as performed by a signal sending node, in accordance with one embodiment.

FIG. 1 is a flow chart illustrating an exemplary procedure for enabling appropriate link quality estimation, as performed by a signal sending node in communication with a signal receiving node over a wireless link. The sending node may be a base station or the like and the receiving node may be a user terminal, or vice versa, and it should be noted that the terms sending node and receiving node merely indicate the direction of the link under consideration. In a first step 100, a regular link state report is received from the receiving node containing a link quality estimation and/or a link parameter recommendation. The receiving node has thus made a link quality estimation in a more or less conventional manner based on signal measurements, e.g. measurements of signal power or SINR on received RSs as described above, which is reflected in the link state report.

In a next step 102, the sending node estimates the current state of the link, which can be made in different ways. For example, when retransmission of data blocks based on ACK/NACK reports is employed in a HARQ (Hybrid Automatic Repeat ReQuest) process to correct any erroneously received data, the ACK/NACK messages from the receiving node may be monitored to determine whether the Block Error Rate BLER or similar parameter deviates from a predetermined target value. If the BLER is below the target value, it is assumed that the receiving node has underestimated the link quality in the link state report, and vice versa. ACK/NACK messages from other nodes may also be taken into account when the sending node estimates the link state. However, the amount of errors can be monitoring in other ways, depending on the technology and protocols used. Further, the current traffic load in the network may also be monitored, assuming that a high load in the area from ongoing data transmissions generally results in relatively high interference, and vice versa.

It is then determined in a following step 104 whether the estimated link state indicates that the received link state report is inaccurate, i.e. misleading and not reflecting the true link state or quality. As described above, this may be the case when the receiving node measures the signal power or SINR for REs containing RSs instead of payload data and when the interference from data transmissions is relatively low, resulting in a report with underestimation of the link quality with respect to data transmissions.

If the received link state report is determined to be accurate by matching the estimated link state, it can be used for relevant and appropriate link adaptation in an optional step 106 and/or for scheduling decisions for packet-switched communications. However, if the link state report is deemed inaccurate in relation to the estimated link state, a measurement adjusting parameter or PMO profile is determined based on the deviation between the received link state report and the estimated actual link state, which is sent to the receiving node, in a further step 108.

The measurement adjusting parameter or PMO profile may be conveyed to the receiving node by means of suitable control signalling such as common control signalling, e.g. broadcast, or dedicated control signalling, e.g. RRC (Radio Resource Control). It will be described in more detail later below how a PMO profile can be determined by the sending node and used by the receiving node in the case when the signal power in a measured channel deviates from that of a data channel, e.g. when REs containing RSs are being measured.

The receiving node will now use the measurement adjusting parameter or PMO profile for adjusting the signal measurements, e.g. signal power or SINR, upon which the link quality estimation and/or link parameter recommendation is based, to compensate for any underestimation or overestimation of the signal power or SINR or other measured parameter. A PMO-adjusted link state report is then received from the receiving node in a next step 110, containing a link quality estimation and/or a link parameter recommendation based on signal measurements, e.g. signal power or SINR, adjusted by the measurement adjusting parameter or PMO profile determined and sent in step 108.

The sending node is now able to use the PMO-adjusted link state report for obtaining a more appropriate link adaptation, in an optional final step 112. Alternatively or additionally, the PMO-adjusted link state report can also be used for scheduling decisions for packet-switched communications, as similar to step 106 above. When receiving a PMO-adjusted link state report from the receiving node in step 110, the sending node may iteratively repeat steps 104, 106 and 110, as shown by the dashed arrow, to find out if the used PMO profile was apt. Meanwhile, link adaptation may be employed according to step 112 using the latest received PMO-adjusted link state report. Furthermore, the step 102 of estimating the link state may be executed on a more or less continuous basis in order to keep the typically fluctuating link state up-to-date.

In this way, more accurate link state reports can be obtained from the receiving node and more appropriate link adaptation and/or scheduling decisions can therefore also be made based on the link state reports. For example, when MIMO is used in LTE for multiple data streams, moving the compensation of erroneously estimated interference from the base station to the user terminal may significantly improve the accuracy of the recommended transmission rank and thereby also the accuracy of the reported CQI which relates directly to the transmission rank. This procedure thus provides a mechanism for the base station to alter the "aggressiveness" or "defensiveness" of the CQI estimation in the user terminal by incorporating the transmission rank preferred by the user terminal.

Figure 2:
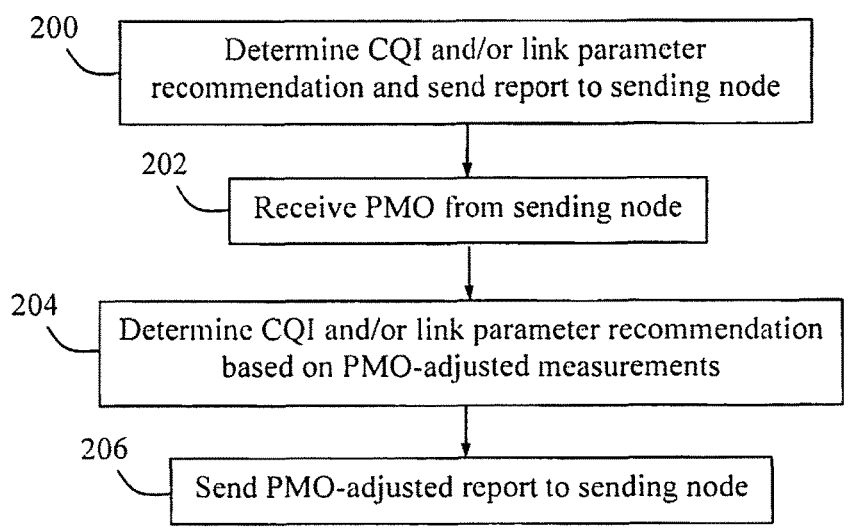
FIG. 2 is a flow chart illustrating a procedure for enabling accurate link quality estimation as performed by a signal receiving node, in accordance with another embodiment.

The flow chart of FIG. 2 illustrates an exemplary procedure for enabling appropriate link quality estimation, as performed by a signal receiving node in communication with a signal sending node over a wireless link, where the sending node basically executes the procedure of FIG. 1. In a first step 200, a CQI and/or link parameter recommendation is determined in a more or less conventional manner based on signal measurements, e.g. signal power or SINR measurements, and a resulting link state report is sent to the sending node, as corresponding to step 100. In a next step 202, a measurement adjusting parameter or PMO profile is received from the sending node, e.g. by means of common or dedicated control signalling, as a consequence of detecting that the previous link state report did not match the actual link state, as corresponding to steps 104 and 108.

In a following step 204, the receiving node determines a link quality estimation, e.g. CQI, and/or link parameter recommendation based on signal measurements such as signal power or SINR adjusted by the received measurement adjusting parameter or PMO. The adjustment of signal power or SINR measurements will be described in more detail below with reference to FIG. 3. Finally, a PMO-adjusted link state report is sent to the sending node in a last shown step 206, containing the above link quality estimation and/or a link parameter recommendation. The sending node will then be able to use the PMO-adjusted link state report for obtaining a more appropriate link adaptation, as of step 112.

Figure 3:
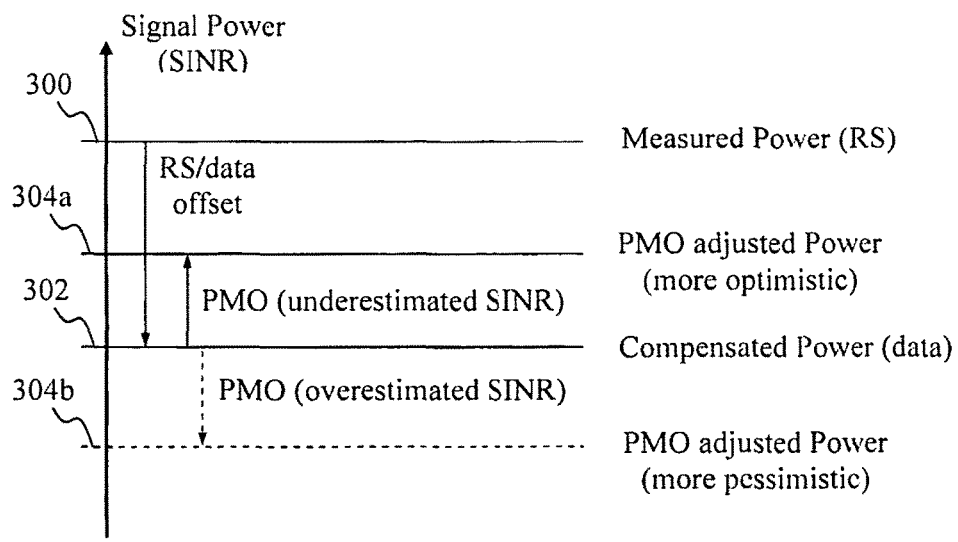
FIG. 3 is a signal power diagram illustrating different power levels when the present invention is used for link quality estimation, in accordance with yet another embodiment.

FIG. 3 is a schematic diagram illustrating how the receiving node can adjust a measured signal power or SINR with a PMO received from the sending node. The vertical arrow in the figure represents a power scale on which different power levels are shown as horizontal lines 300-304a/b. In this case, a logical channel on the wireless link is measured where the signal power or SINR deviates from that of a logical data channel which is used for transmission of payload data. In this example, the measured channel contains RSs with different interference as compared to the current interference on the data channel.

First, the receiving node measures the signal power or SINR 300 of the measured channel. Further, a predetermined and stipulated power offset value between data and RS has been provided, e.g. from the sending node, which the receiving node uses to compensate for a typically occurring difference in the power between data and RS. Thereby, a compensated power/SINR level 302 is obtained and the receiving node determines a link quality estimation and/or link parameter recommendation based on the compensated power/SINR level 302 and sends a corresponding link state report to the sending node. Preferably, the receiving node provides a plurality of such link state reports to the sending node to provide sufficient statistics and basis for the sending node to assess the reports.

Next, the sending node determines a PMO profile after detecting that the link state report does not match the actual link state, as described above, and sends the PMO profile to the receiving node. Generally, a PMO profile may comprise one or more specific measurement adjusting parameters depending on the implementation. As described above, the actual link state can be estimated by monitoring ACK/NACK messages, which should preferably be made basically at the same time as the link state reports are made.

The receiving node then adjusts the power/SINR level 302 by the PMO and obtains a PMO-adjusted power/SINR level 304a, in this case being a higher and thus more "optimistic" power/SINR level than level 302 due to an underestimated Power/SINR. In another example, the PMO-adjusted power/SINR level 304b, may be lower and thus a more "pessimistic" power/SINR level than level 302 due to an overestimated Power/SINR, as indicated by the dashed lines.

Some more detailed examples will now be described of how the sending node can calculate a PMO profile and how the PMO can be used by the receiving node to compute a CQI and recommended link parameters such as transmission rank. Using the formula (1) above, the data channel can be modeled as:

$$r(\text{data})=H(\text{data})s+n(\text{data}) \qquad (2)$$

As mentioned above, the measured channel may deviate from the data channel and the measurement channel can be denoted as:

$$r(m)=H(m)s+n(m) \qquad (3)$$

The PMO profile, configured by the sending node, effectively describes the mapping from the measurement channel to the data channel. For example, the PMO profile could be a channel power scaling value "P(PMO)". In order to determine CQI and preferred transmission rank, the data channel can be estimated as:

$$r(\text{data}) \approx \text{sqrt}P(PMO)H(m)s+n(m) \qquad (4)$$

where "sqrtP(PMO)" denotes the square root of P(PMO).

Other ways of estimating the data channel are also conceivable, as for example:

$$r(\text{data}) \approx H(m)s+\text{sqrt}P(PMO)n(m) \qquad (5)$$

or:

$$r(\text{data}) \approx H(m)s+n(m)+\text{sqrt}P(PMO)I(m) \qquad (6)$$

In (6), the noise and interference of the measured channel have been divided into a separate noise term n(m) and a separate interference term I(m).

When the receiving node computes the CQI and recommended link parameters such as transmission rank, it uses the estimated data channel instead of using the measurement channel. It should be noted that the noise and interference are modeled statistically and may also be averaged over time and frequency, to capture long term variations rather than a short term behavior.

The signal sending node may determine a suitable PMO profile based on several possible input variables. For example, the ACK/NACK signalling of a HARQ process can be monitored. If the BLER or a similar parameter reflecting the data error rate does not match a target value, the PMO profile is adjusted accordingly. If the PMO profile of (4) is used and the BLER is detected to be below the target value, the P(PMO) is increased and the receiving node will use a more optimistic mapping from the measurement channel to the data channel when determining CQI and recommended link parameters, e.g. transmission rank. This may be accomplished by using a PMO value to adjust an assumed RS/data offset, as shown in FIG. 3, to a more realistic power value considering the actual link state.

As mentioned above, a base station acting as the sending node could also determine the PMO profile based on HARQ ACK/NACK statistics from multiple user terminals in the area, possibly filtered over a period of time. Alternatively or additionally, the PMO profile could be determined based on the current traffic load in the network, e.g. the average load in surrounding cells. A base station is able to obtain such traffic load information by means of so-called backhaul signalling, e.g. according to the X2 protocol.

A signal sending node and a signal receiving node will now be described in more detail with reference to FIG. 4, in accordance with further exemplary embodiments. The signal sending node 400, which may be a base station, is basically configured to perform the steps in FIG. 1, whereas the signal receiving node 402, which may be a user terminal, is basically configured to perform the steps in FIG. 2. In the sending node 400, a sending unit 400a is configured to send at least data signals and RS signals to the receiving node 402 over a wireless link under consideration.

Receiving node 402 comprises a receiving unit 402a configured to receive the data and RS signals, a signal measuring unit 402b adapted to measure received signals, e.g. with respect to power or SINR, a quality estimating unit 402c adapted to estimate link quality, e.g. CQI, and determine recommended link parameters, and a reporting unit 402d adapted to send link state reports to the sending node 400.

Sending node 400 further comprises a report receiver 400b adapted to receive link state reports from node 400, and a link state estimator 400c adapted to estimate the current state of the considered link, e.g. based on received information on the amount of data errors occurring on the link and/or information on the current traffic load in the network, as indicated by a dashed arrow. Sending node 400 also comprises a determining unit 400d adapted to determine a measurement adjusting parameter, e.g. a PMO profile, if a link state report received from node 402 does not match the estimated link state, based on the estimated link state in relation to the link state report, and further adapted to provide the measurement adjusting parameter to the quality estimating unit 402c in node 402.

Quality estimating unit 402c is further adapted to obtain a measurement adjusting parameter from the sending node 400, and to determine a link quality estimation and/or link parameter recommendation based on signal measurements, e.g. signal power or SINR measurements, adjusted by the received measurement adjusting parameter. Reporting unit 402d is further adapted to send an adjusted link state report to the sending node 400 containing the determined link quality estimation and/or link parameter recommendation. The report receiver 400b is further adapted to receive the adjusted link state report from the receiving node 402 which is based on signal measurements adjusted by means of the measurement adjusting parameter. Finally, the sending unit 400a may be further adapted to use the adjusted link state report for link adaptation of the wireless link.

Figure 4:
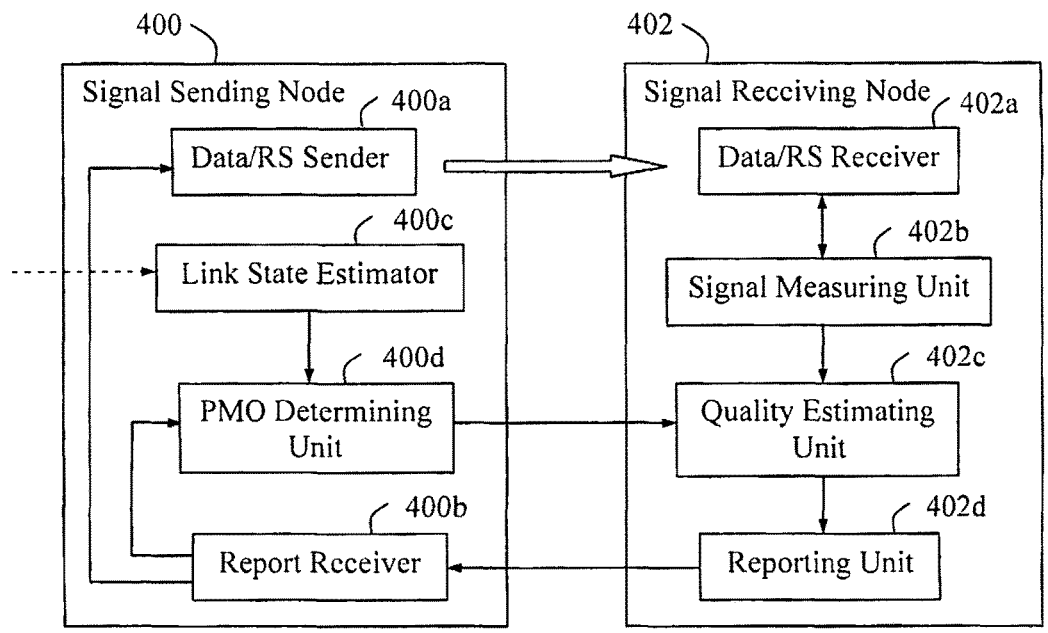
FIG. 4 is a block diagram illustrating a signal sending node and a signal receiving node in more detail, in accordance with further embodiments.

It should be noted that FIG. 4 merely illustrates various functional units in the sending and receiving nodes 400, 402 in a logical sense, while these functions can be implemented in practice using any suitable software and hardware, without departing from the present invention.

By using any of the above-described embodiments, more accurate link adaptation, power control and/or scheduling may be accomplished, potentially resulting in improved capacity, coverage and/or quality in the network. Any estimation errors of noise and inter-cell interference may thus be compensated, such that the link state reports from the receiving node, e.g. including estimated CQI and recommended transmission rank, will match and be closely aligned with what the channel actually supports.

While the invention has been described with reference to specific exemplary embodiments, the description is in general only intended to illustrate the inventive concept and should not be taken as limiting the scope of the invention. For example, although the concepts of LTE, OFDM, MIMO, CQI, SINR, resource elements, transmission rank, HARQ and ACK/NACK messages have been used when describing the above embodiments, any other similar suitable standards, parameters and mechanisms may basically be used to accomplish the functions described herein. The present invention is generally defined by the following independent claims.

What is claimed is:

1. A method, in a sending node, of enabling link quality estimation of a wireless link used for transmitting signals from the sending node to a receiving node, the method comprising:
   receiving at least one link state report;
   estimating the current state of the wireless link;
   sending a measurement adjusting parameter to the receiving node; and
   receiving a subsequent link state report containing a determined link quality estimation or a link parameter recommendation, or both, which are based on signal measurements adjusted by the measurement adjusting parameter.

2. The method of claim 1, further comprising using the subsequent link state report for link adaptation of the wireless link or for packet scheduling decisions, or both.

3. The method of claim 1:
   further comprising sending payload data and reference symbols to the receiving node, which configures the link state reports based on signal measurements on the reference symbols;
   wherein the measurement adjusting parameter compensates for a difference in received power or SINR between measured signals and data signals.

4. The method of claim 1, wherein the measurement adjusting parameter is a Power Measurement Offset (PMO) that the receiving node uses for adjusting signal power or SINR measurements upon which the subsequent link state report is based.

5. The method of claim 1, wherein the determined link quality estimation comprises a Channel Quality Indicator (CQI).

6. The method of claim 1, wherein the link parameter recommendation comprises a preferred transmission rank specifying a number of parallel data streams when multiple antennas are used.

7. The method of claim 1, wherein the estimating the current state of the wireless link comprises estimating the current state of the wireless link by monitoring an amount of data errors occurring over the wireless link as compared to a predetermined target value.

8. The method of claim 7, wherein ACK/NACK messages from the receiving node are monitored to determine whether a Block Error Rate (BLER) or equivalent parameter deviates from the target value.

9. The method of claim 1, wherein the estimating the current state of the wireless link comprises estimating the current state of the wireless link by monitoring a current traffic load in the network used.

10. An apparatus for enabling link quality estimation of a wireless link used for transmitting signals from a sending node to a receiving node, the apparatus comprising:
    a report receiver configured to receive at least one link state report;
    a link state estimator configured to estimate the current state of the wireless link; and
    a determining unit configured to send a measurement adjusting parameter to the receiving node; and
    wherein the report receiver is further configured to receive a subsequent link state report containing a determined link quality estimation or a link parameter recommendation, or both, which are based on signal measurements adjusted by the measurement adjusting parameter.

11. The apparatus of claim 10, further comprising a sending unit configured to use the adjusted link state report for link adaptation of the wireless link or for packet scheduling decisions, or both.

12. The apparatus of claim 10 further comprising a sending unit configured to send payload data and reference symbols to the receiving node, which configures the link state reports based on signal measurements on the reference symbols, and wherein the measurement adjusting parameter compensates for a difference in received power or SINR between measured signals and data signals.

13. The apparatus of claim 10, wherein the measurement adjusting parameter is a Power Measurement Offset (PMO) that the receiving node uses for adjusting signal power or SINR measurements upon which the adjusted link state report is based.

14. The apparatus of claim 10, wherein the determined link quality estimation comprises a Channel Quality Indicator (CQI).

15. The apparatus of claim 10, wherein the link parameter recommendation comprises a preferred transmission rank specifying a number of parallel data streams when multiple antennas are used.

16. The apparatus of claim 10, wherein the link state estimator is further configured to estimate the current state of the wireless link by monitoring an amount of data errors occurring over the wireless link as compared to a predetermined target value.

17. The apparatus of claim 10, wherein the link state estimator is further configured to estimate the current state of the wireless link by monitoring a current traffic load in the network used.

18. A method, in a receiving node, of enabling link quality estimation of a wireless link used for transmitting signals from a sending node to the receiving node, the method comprising:
  receiving a measurement adjusting parameter from the sending node;
  determining one or both of a subsequent link quality estimation and a subsequent link parameter recommendation based on signal measurements adjusted by the received measurement adjusting parameter; and
  sending an adjusted link state report to the sending node, the adjusted link state report containing one or both of the subsequent link quality estimation and the subsequent link parameter recommendation.

19. The method of claim 18:
  further comprising receiving payload data and reference symbols from the sending node and configuring the link state report based on signal measurements on the reference symbols; and
  wherein the measurement adjusting parameter compensates for a difference in received power or SINR of measured signals and data signals.

20. The method of claim 18, wherein the measurement adjusting parameter is a Power Measurement Offset (PMO) that the receiving node uses for adjusting signal power or SINR measurements upon which the adjusted link state report is based.

* * * * *

UNITED STATES PATENT AND TRADEMARK OFFICE
CERTIFICATE OF CORRECTION

PATENT NO. : 9,838,889 B2  
APPLICATION NO. : 15/077076  
DATED : December 5, 2017  
INVENTOR(S) : Hammarwall et al.

Page 1 of 1

It is certified that error appears in the above-identified patent and that said Letters Patent is hereby corrected as shown below:

In the Specification

In Column 1, Line 6, delete "2012," and insert -- 2012, now Pat. No. 9,300,432, --, therefor.

In Column 1, Line 7, delete "2010," and insert -- 2010, now Pat. No. 8,325,624, --, therefor.

In Column 10, Line 29, delete "$r(data) \approx H(m)s + n(m) + sqrtP(PMO)I(m)$" and insert -- $r(data) \approx H(m)s + n(m) + sqrtP(PMO) I(m)$ --, therefor.

In the Claims

In Column 13, Line 8, in Claim 12, delete "claim 10" and insert -- claim 10, --, therefor.

In Column 14, Line 1, in Claim 17, delete "of 10," and insert -- of claim 10, --, therefor.

Signed and Sealed this  
Twenty-third Day of January, 2018

Joseph Matal  
*Performing the Functions and Duties of the*  
*Under Secretary of Commerce for Intellectual Property and*  
*Director of the United States Patent and Trademark Office*